3,185,735
STABILIZATION OF POLYOXYALKYLENE
COMPOUNDS
Donald G. Leis, St. Albans, and George Magnus and
Henry E. Fritz, Charleston, W. Va., assignors to Union
Carbide Corporation, a corporation of New York
No Drawing. Filed Aug. 3, 1961, Ser. No. 128,949
1 Claim. (Cl. 260—611.5)

This invention relates to oxidation-stabilized polyoxyalkylene compositions and to a process for their preparation.

Polyoxyalkylene compounds, in general, are well-known to the art and are commercially useful in a wide variety of applications. They are employed, for example, as emulsifiers, lubricants, hydraulic fluids, plasticizers, detergents, heat transfer liquids, and the like. However, the effectiveness of polyoxyalkylene compounds in many of these applications has been severely limited by their susceptibility to oxidation by air and other oxidizing agents. Such oxidation, being accompanied by chemical decomposition or degradation, results in a loss of many desirable physical characteristics. For example, in higher molecular weight polyoxyalkylene compounds, i.e. those having an average molecular weight of above about 4000, prolonged exposure to air often results in a substantial reduction of the average molecular weight of the compounds, as evidenced by a reduction in viscosity, formation of volatile materials on heating, and, in some instances, by a change from solid to liquid state. Moreover, in addition to reducing the effectiveness of these compounds in existing applications, their sensitivity to oxidation has precluded the development of other possible applications.

In the past, efforts to stabilize polyoxyalkylene compounds against oxidative degradation have met with only limited success. For example, various types of phenols have been employed to form polyoxyalkylene compositions with reduced oxidation susceptibility. Typical of the more effective of known stabilizers are 2,6-ditertiary-butyl-4-methylphenol and diphenylolpropane. However, the use of these two compounds, while providing some degree of inhibition against oxidative degradation, has not been found entirely satisfactory in substantially eliminating the susceptibility of the polyoxyalkylene compounds to oxidation.

The oxidation-stabilized polyoxyalkylene compositions of the present invention exhibit a greatly improved degree of stability against oxidative degration. Furthermore, the stabilized polyoxyalkylene compositions of this invention may be used to prepare polyoxyalkylene derivatives which similarly exhibit a high degree of stability against oxidation.

The polyoxyalkylene compositions of the present invention are prepared by admixing a polyoxyalkylene compound with a stabilizer selected from the group of tertiary-alkyl substituted phenols having the following general formulae, in which R is a tertiary alkyl radical having from four to eight carbon atoms:

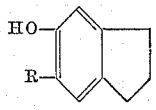

6-tertiary-alkyl-5-indanol     (I)

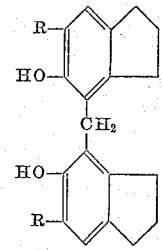

4,4'-methylene bis(6-tertiary-alkyl-5-indanol)     (II)

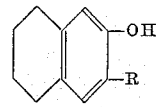

3-tertiary-alkyl-5,6,7,8-tetrahydro-2-naphthol     (III)

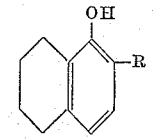

2-tertiary-alkyl-5,6,7,8-tetrahydro-1-naphthol     (IV)

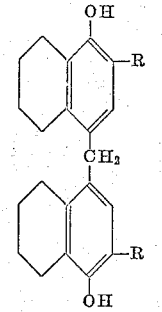

4,4'-methylene bis(2-tertiary-alkyl-5,6,7,8-tetrahydro-1-naphthol)     (V)

As compounds illustrative of the 6-tertiary-alkyl-5-indanols which are useful as stabilizers in accordance with this invention there can be mentioned 6-tertiary-butyl-5-indanol,
6-(1,1-dimethylpropyl)-5-indanol,
6-(1,1-dimethylbutyl)-5-indanol,
6-(1,1,2-trimethylpropyl)-5-indanol,
6-(1-ethyl-1-methyl-propyl)-5-indanol,
6-(1,1,2,2-tetramethylpropyl)-5-indanol,
6-(1,1-dimethylpentyl)-5-indanol,
6-(1,1-diethylpropyl)-5-indanol,
6-(1-ethyl-1-methylbutyl)-5-indanol,
6-(1,1,2-trimethylbutyl)-5-indanol,
6-(1,1,3-trimethylbutyl)-5-indanol,
6-(1-ethyl-1,2-dimethylpropyl)-5-indanol,
6-(1,1-dimethyl-2-ethyl-propyl)-5-indanol, and the like.

Suitable 4,4'-methylene bis(6-tertiary-alkyl-5-indanol) stabilizers include 4,4-methylene bis(6-tertiary-butyl-5-indanol),
4,4'-methylene bis[6-(1,1-dimethylpropyl)-5-indanol],
4,4'-methylene bis[6-(1,1-dimethylbutyl)-5-indanol],
4,4'-methylene bis[6-(1,1,2-trimethylpropyl)-5-indanol], 4,4'-methylene bis[6-(1-ethyl-1-methylpropyl)-5-indanol],
4,4'-methylene bis[6-(1,1,2,2-tetramethylpropyl)-5-indanol],
4,4'-methylene bis[6-(1,1-dimethylpentyl-5-indanol],
4,4'-methylene bis[6-(1,1-diethylpropyl)-5-indanol],
4,4'-methylene bis[6-(1-ethyl-1-methylbutyl)-5-indanol],
4,4'-methylene bis[6-(1,1,2-trimethylbutyl)-5-indanol],
4,4'-methylene bis[6-(1,1,3-trimethylbutyl)-5-indanol],
4,4'-methylene bis[6-(1-ethyl-1,2-dimethylpropyl)-5-indanol],
4,4'-methylene bis[6-(1,1-dimethyl-2-ethylpropyl)-5-indanol], and the like.

Illustrative of the 3-tertiary-alkyl-5,6,7,8-tetrahydro-2-naphthols which are useful as stabilizers are:

3-tertiary-butyl-5,6,7,8-tetrahydro-2-naphthol,
3-(1,1-dimethylpropyl)-5,6,7,8-tetrahydro-2-naphthol,
3-(1,1-dimethylbutyl)-5,6,7,8-tetrahydro-2-naphthol,
3-(1,1,2-trimethylpropyl)-5,6,7,8-tetrahydro-2-naphthol,
3-(1-ethyl-1-methylpropyl)-5,6,7,8-tetrahydro-2-naphthol,
3-(1,1,2,2-tetramethylpropyl)-5,6,7,8-tetrahydro-2-naphthol,
3-(1,1-dimethylpentyl)-5,6,7,8-tetrahydro-2-naphthol,
3-(1,1-diethylpropyl-5,6,7,8-tetrahydro-2-naphthol,
3-(1-ethyl-1-methylbutyl)-5,6,7,8-tetrahydro-2-naphthol,
3-(1,1,2-trimethylbutyl)-5,6,7,8-tetrahydro-2-naphthol,
3-(1,1,3-trimethylbutyl)-5,6,7,8-tetrahydro-2-naphthol,
3-(1-ethyl-1,2-dimethylpropyl)-5,6,7,8-tetrahydro-2-naphthol,
3-(1,1,-dimethyl-2-ethylpropyl)-5,6,7,8-tetrahydro-2-naphthol, and the like.

Illustrative of the 2-tertiary-alkyl-5,6,7,8-tetrahydro-2-naphthols which are useful as stabilizers are 2-tertiary-butyl-5,6,7,8-tetrahydro-1-naphthol,
2-(1,1-dimethylpropyl)-5,6,7,8-tetrahydro-1-naphthol,
2-(1,1-dimethylbutyl)-5,6,7,8-tetrahydro-1-naphthol,
2-(1,1,2-trimethylpropyl)-5,6,7,8-tetrahydro-1-naphthol,
2-(1-ethyl-1-methylpropyl)-5,6,7,8-tetrahydro-1-naphthol,
2-(1,1,2,2-tetramethylpropyl)-5,6,7,8-tetrahydro-1-naphthol,
2-(1,1-dimethylpentyl)-5,6,7,8-tetrahydro-1-naphthol,
2-(1,1-diethylpropyl)-5,6,7,8-tetrahydro-1-naphthol,
2-(1-ethyl-1-methylbutyl)-5,6,7,8-tetrahydro-1-naphthol,
2-(1,1,2-trimethylbutyl)-5,6,7,8-tetrahydro-1-naphthol,
2-(1,1,3-trimethylbutyl)-5,6,7,8-tetrahydro-1-naphthol,
2-(1-ethyl-1,2-dimethylpropyl)-5,6,7,8-tetrahydro-1-naphthol,
2-(1,1-dimethyl-2-ethylpropyl)-5,6,7,8-tetrahydro-1-naphthol, and the like.

Illustrative of the 4,4'-methylene bis(2-tertiary-alkyl-5,6,7,8-tetrahydro-1-naphthols) which are useful as stabilizers are 4,4'-methylene bis(2-tertiary-butyl-5,6,7,8-tetrahydro-1-naphthol),
4,4'-methylene bis[2-(1,1-dimethylpropyl)-5,6,7,8-tetrahydro-1-naphthol],
4,4'-methylene bis[2-(1,1-dimethylbutyl)-5,6,7,8-tetrahydro-1-naphthol],
4,4'-methylene bis[2-(1,1,2-trimethylpropyl)-5,6,7,8-tetrahydro-1-naphthol],
4,4'-methylene bis[2-(1-ethyl-1-methylpropyl)-5,6,7,8-tetrahydro-1-naphthol],
4,4'-methylene bis[2-(1,1,2,2-tetramethylpropyl)-5,6,7,8-tetrahydro-1-naphthol],
4,4'-methylene bis[2-(1,1-dimethylpentyl)-5,6,7,8-tetrahydro-1-naphthol],
4,4'-methylene bis[2-(1,1-diethylpropyl)-5,6,7,8-tetrahydro-1-naphthol],
4,4'-methylene bis[2-(ethyl-1-methylbutyl)-5,6,7,8-tetrahydro-1-naphthol],
4,4'-methylene bis[2-(1,1,2-trimethylbutyl)-5,6,7,8-tetrahydro-1-naphthol],
4,4'-methylene bis[2-(1,1,3-trimethylbutyl)-5,6,7,8-tetrahydro-1-naphthol],
4,4'-methylen bis[2-(1-ethyl-1,2-dimethylpropyl)-5,6,7,8-tetrahydro-1-naphthol],
4,4'-methylene bis[2-(1,1-dimethyl-2-ethylpropyl)-5,6,7,8-tetrahydro-1-naphthol], and the like.

The polyoxyalkylene compounds that can be stabilized in accordance with the present invention include those conventionally prepared by the reaction of an alkylene oxide with either water or an aliphatic mono-, di-, or polyhydric alcohol to give products preferably having an average molecular weight ranging from about 60 to about 6000. Normally a catalyst, such as an alkali or a Lewis acid, is employed in the reaction.

Although any conventional preparative method can be employed, the polyoxyalkylene compounds are preferably prepared by reacting the alkylene oxide with water or the mono-, di-, or polyhydric alcohol in a mol ratio of from about 3:1 to about 100:1, at temperatures of from about 50° C. to 200° C., and at pressures of from about 10 p.s.i.g. to about 150 p.s.i.g., in the presence of an alkaline catalyst, for example, a caustic alkali such as sodium hydroxide, or an alkali alcoholate, such as sodium ethylate. In addition, the polyoxyalkylene compounds which can be stabilized in accordance with the invention include dietheric polyoxyalkylene compounds. Such diethers can be prepared by treating the monoether with a roughly equimolar quantity of sodium hydroxide to give the corresponding alcoholate while removing the water former. The alcoholate is then reacted with an alkyl halide, such as butyl bromide, or an alkyl sulfate, such as dimethyl sulfate, ethyl hydrogen sulfate, and the like, to give the dietheric poloxyalkylene compound.

Of particular concern to the invention is the stabilization of polyoxyalkylene compounds having the general formula:

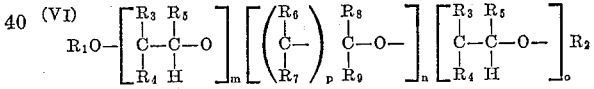

wherein $R_1$ is selected from the group consisting of hydrogen and alkyl radicals having from 1 to about 12 carbon atoms, and preferably from one to about 8 carbon atoms; $R_2$ is selected from the group consisting of hydrogen and alkyl radicals having from 1 to about 8 carbon atoms and preferably from 1 to about 4 carbon atoms; $R_3$, $R_4$, $R_5$, $R_6$, $R_7$, $R_8$, and $R_9$ are selected from the group consisting of hydrogen and alkyl radicals having from 1 to about 6 carbon atoms; $m$ is an integer having a value from 1 to about 150; $n$ is an integer having a value from 0 to 4; $o$ is an integer having a value from 0 to about 150; and is such that the sum of $m$ and $o$ is not greater than 150; and $p$ is an integer having a value from 1 to 3.

The polyoxyalkylene compounds responding to the general Formula VI given above include those prepared by the reaction of at least one 1,2-alkylene oxide, such as ethylene oxide, 1,2-propylene oxide, 1,2-butylene oxide, 1,2-pentylene oxide, and the like, with either water; an alkyl monohydroxy alcohol, such as methanol, ethanol, propanol, butanol, pentanol, hexanol, and the like; an alkylene glycol such as ethylene glycol, propylene glycol, butylene glycol, pentylene glycol, and the like; or an etheric di- or polyalkylene glycol such as diethylene glycol

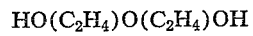

dipropylene glycol

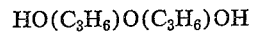

triethylene glycol

and the like.

As typical of the polyoxyalkylene compounds which can be stabilized in accordance with this invention there can be mentioned the polyoxyalkylene glycols prepared by the addition of a 1,2-alkylene oxide to either water, a 1,2-alkylene glycol, diethylene glycol, or a polyethylene glycol. For such polyoxyalkylene glycols general Formula VI reduces to the following formula:

(VII) 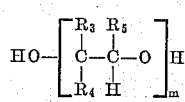

wherein $R_3$, $R_4$, $R_5$ and $m$ are as defined above. Other polyoxyalkylene glycols which can be stabilized in accordance with this invention are those prepared by the addition of a 1,2-alkylene oxide to alkylene glycols other than 1,2-alkylene glycols, such as 1,3-propanediol, 1,3-butanediol, 1,4- butanediol, and the like. Such polyoxyalkylene glycols can be represented by the formula:

(VIII) 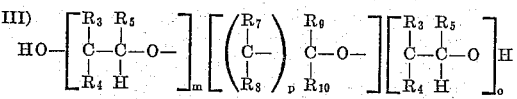

wherein $R_3$, $R_4$, $R_5$, $R_6$, $R_7$, $R_8$, $R_9$, $R_{10}$, $m$, $o$, and $p$ are as defined above. It can be seen that Formula VI, above, reduces to Formula VIII when $n=1$, and $R_1$ and $R_2$ are hydrogen. Still other polyoxyalkylene glycols which can be stabilized in accordance with this invention, by way of further illustration, are those prepared by the addition of a 1,2-alkylene oxide to etheric polyalkylene glycols such as dipropylene glycol, tripropylene glycol, tetrapropylene glycol, tributylene glycol, and the like, are illustrative. Such polyoxyalkylene glycols can be represented by the general formula (IX) 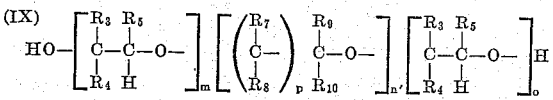

wherein $R_3$, $R_4$, $R_5$, $R_6$, $R_7$, $R_8$, $R_9$, $R_{10}$, $m$, $o$, and $p$ are as defined above, and $n'$ is an integer having a value from 2 to 4.

Also typical of the polyoxyalkylene compounds which are stabilized in accordance with this invention are polyoxyalkylene glycol monoalkyl ethers prepared by the addition of a 1,2-alkylene oxide to an alkyl monohydroxy alcohol. Such alcohols, which can be represented by the formula $R'_1OH$ where $R'_1$ is an alkyl radical having from 1 to about 12 carbon atoms, and preferably from 1 to about 8 carbon atoms, include methanol, ethanol, n-propanol, isopropanol, butanol, pentanol, hexanol, heptanol, octanol, nonanol, decanol, undecanol, dodecanol, and the like. These monoalkyl ethers are of the type described in U.S. Patents 2,213,477; 2,448,664; 2,425,755; and 2,677,700, prepared by reacting a 1,2-alkylene oxide, such as ethylene oxide and 1,2-propylene oxide, mixtures thereof, or ethylene oxide and 1,2-propylene oxide sequentially, with the alkyl monohydroxy alcohol. Such compounds can be depicted by the general formula (X) 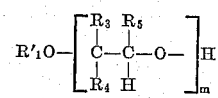

wherein $R'_1$, $R_3$, $R_4$, $R_5$, and $m$ are as defined above.

Also illustrative of the polyoxyalkylene compounds which can be stabilized by this invention are polyoxyalkylene glycol dialkyl ethers which are prepared by alkylating the above-described glycols and ethers. Such compounds can be represented by the general formula (XI) 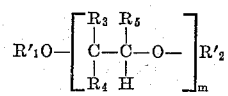

wherein $R'_1$, $R_3$, $R_4$, $R_5$, and $m$ are as defined above, and $R'_2$ is an alkyl radical having from 1 to about 8 carbon atoms, preferably from 1 to about 4 carbon atoms.

The stabilized polyoxyalkylene compositions of this invention are prepared by admixing one or more of the polyoxyalkylene compounds described above, preferably when in liquid form, with one of the stabilizers of this invention. The stabilizer is preferably added to the liquid polyoxyalkylene compound in solid form by simply dissolving it in the polyoxyalkylene compound. Alternatively, the stabilizer may first be dissolved in another organic solvent, such as methanol, ethanol, n-butanol, ethylene glycol, propylene glycol, benzene, toluene, dioxane, methoxy ethylene glycol and the like, and the resulting solution admixed with the polyoxyalkylene compound to be stabilized. This latter procedure, however, is less preferred in that a foreign substance is introduced into the polyoxyalkylene composition.

The quantity of stabilizer can be varied broadly. Preferably, the stabilizer is admixed with the polyoxyalkylene compound in a proportion of from about 0.01 percent to about 5.0 percent by weight, based upon the total weight of the polyoxylalkylene composition. Stabilizing quantities smaller than 0.01 weight percent are, generally not effective in reducing oxidative susceptibility significantly, while little commensurate advantage is gained by using amounts greater than 5.0 weight percent.

The incorporation of stabilizer can be carried out at temperatures up to about 150° C. and preferably at temperatures above the melting point of the polyoxyalkylene compound to be stabilized. At temperatures above about 150° C., the polyoxyalkylene compounds which can be stabilized by this invention are subjected to thermal decomposition which offsets the advantage gained by stabilization.

A series of experiments illustrative of this invention were performed. The polyoxyalkylene compounds used were prepared as described below and are designated as compounds A to F. Compounds A to F were stabilized in accordance with this invention by heating them to about 65–70° C., at which temperature they exist in the liquid state, and dissolving in them the indicated stabilizer by adding the stabilizer in solid form and stirring for about five minutes, to give stabilized compositions containing 0.5 parts of stabilizer per 100 parts of composition, by weight. Similarly, compositions using two known stabilizers were prepared by dissolving each of the known stabilizers in compounds A to F to give compositions containing 0.5 part of stabilizer per 100 parts of composition, by weight. The above-described compositions, as well as controls containing no stabilizer, were tested for volatiles formation on heating to determine their resistance to oxidative degradation. The test employed is described below and the results obtained are set forth in Table I, below.

COMPOUND A

Compound A was prepared by adding propylene oxide to butanol in a mol ratio of 100:1 (oxide to alcohol) at a temperature of from 90° C. to 110° C., and at a pressure of approximately 60 p.s.i.g. The addition was carried out, with stirring, over a period of about 20 hours, in the presence of 0.25 wt. percent potassium hydroxide catalyst. After neutralization of the catalyst and filtration, the product obtained had a viscosity of approximately 1715 Saybolt Universal seconds at 100° F.

COMPOUND B

Compound B was prepared by adding ethylene oxide to water in a mol ratio of 9:1 (oxide of water) at a temperature of from 90° C. to 110° C. and at pressure of approximately 60 p.s.i.g. The addition was carried out with stirring, over a period of about 10 hours, in the presence of 0.25 wt. percent of potassium hydroxide catalyst. After neutralization of the catalyst and filtration, the product obtained had an average molecular weight of about 400.

COMPOUND C

Compound C was prepared by adding ethylene oxide to methanol in a mol ratio of 12:1 (oxide to alcohol) at a temperature of from 90° C. to 110° C. and at a pressure of approximately 60 p.s.i.g. This addition was carried out, with stirring, over a period of about 10 hours, in the presence of 0.25 wt. percent of potassium hydroxide catalyst. After neutralization of the catalyst and filtration, the product obtained had an average molecular weight of about 550.

COMPOUND D

Compound D was prepared by adding propylene oxide to water in a mol ratio of 35:1 (oxide to water) at a temperature of from 90° C. to 110° C., and a pressure of approximately 60 p.s.i.g. The addition was carried out, with stirring, over a period of about 20 hours in the presence of 0.25 wt. percent of potassium hydroxide catalyst. After neutralization of the catalyst and filtration, the product obtained had an average molecular weight of about 2000.

COMPOUND E

Compound E was prepared as follows. Propylene oxide was added to butanol in a mol ratio of 18:1 (oxide to alcohol) at a temperature of from 90° C. to 110° C. and at a pressure of approximately 60 p.s.i.g. The addition was carried out, with stirring, over a period of about 20 hours in the presence of 0.25 wt. percent of potassium hydroxide catalyst. After neutralization of the catalyst and filtration, the product obtained had a viscosity of about 200 Saybolt Universal seconds at 100° F. This product was then treated with potassium hydroxide in a mol ratio of 9:1 and acetylene in a weight ratio of 1:1 at a temperature of about 175° C and at atmospheric pressure, for 2 hours. The resulting product was reduced with hydrogen in the presence of Raney nickel at approximately 70° C., and at a pressure of about 150 p.s.i.g. until essentially no further hydrogen was absorbed to yield a dietheric polyoxyalkylene compound which had a viscosity of about 200 Saybolt Universal seconds at 100° F.

COMPOUND F

Compound F was prepared by adding an equiweight mixture of ethylene oxide and propylene oxide to butanol in a mol ratio of 40:1 (oxides to alcohol), at a temperature of 90° C. to 110° C. and a pressure of approximately 60 p.s.i.g. The addition was carried out, with stirring, over a period of about 20 hours in the presence of 0.25 wt. percent of potassium hydroxide catalyst. After neutralization of the catalyst and filtration, the product obtained had a viscosity of about 660 Saybolt Universal seconds at 100° F.

The polyoxyalkylene compositions prepared as described above were evaluated with regard to their resistance to oxidative degradation as evidenced by their ability to withstand elevated temperatures without forming volatiles. The test employed was a standard evaporation test for volatiles formed by air oxidation, found in the SAE (Society of Automotive Engineers) Report of the Non-Metallic Materials Committee, approved in December 1946 and last revised in December 1955. The test is referred to as "Heavy Duty Type 70 R-1 test D-5." This test was performed as follows: Two 10-milliliter samples of each polyoxyalkylene composition were placed in clean, dry, weighed Petri dishes (10 centimeter diameter, 15 millimeters high) and weighed, with the dish covers in place, to the nearest 0.01 gram. The Petri dishes containing the samples were then placed, on the inverted dish covers, in a Thelco convection oven. A temperature of 212±2° F. was maintained for 144 hours. After this time, the Petri dishes and covers were removed from the oven, allowed to cool to room temperature in a desiccator, and reweighed. Evaporation of the volatiles formed was calculated as percent loss, according to the equation $$\text{percent loss} = \frac{W-R}{W} \times 100$$

where $W$ = initial weight of sample and $R$ = weight of residue after heating.

Table I sets forth the results of these tests.

In Examples I–XXI stabilizers used in accordance with the present invention were employed. In Examples XXII–XXVII, no stabilizer was employed. In Examples XXVII–XXXIX, known stabilizers were employed.

Table I [1]

| Examples | Stabilizer | Polyoxyalkylene compound | | | | | |
|---|---|---|---|---|---|---|---|
| | | A | B | C | D | E | F |
| I–V | 6-tertiary-butyl-5-indanol | 1.1 | | 2.1 | 0.8 | 1.6 | 1.3 |
| VI–XI | 4,4'-methylene bis(6-tertiary-butyl-5-indanol) | 0.8 | 0.8 | 1.3 | 0.3 | 1.4 | 1.1 |
| XII–XVII | 3-tertiary-butyl-5,6,7,8-tetrahydro-2-naphthol | 0.8 | 1.2 | 1.6 | 0.7 | 1.5 | 1.4 |
| XVIII–XIX | 2-tertiary-butyl-5,6,7,8-tetrahydro-1-naphthol | | | | 0.5 | | 1.2 |
| XX–XXI | 4,4'-methylene bis (2-tertiary-butyl-5,6,7,8-tetrahydro-1-napthol) | | | | 0.2 | | 0.5 |
| XXII–XXVII | None | 69.3 | 28.0 | 44.1 | 93.5 | 89.5 | 61.9 |
| XXVII–XXXIII | 2,6-ditertiary-butyl-4-methylphenol | 66.2 | 26.5 | 37.4 | 60.8 | 42.5 | 46.7 |
| XXXIV–XXXIX | Diphenylolpropane | 12.2 | 2.6 | 5.2 | 24.7 | 12.2 | 10.1 |

[1] All results are expressed as percent loss.

What is claimed is:

Oxidation-stabilizer polyoxyalkylene compositions comprising (a) a polyoxyalkylene compound having the general formula

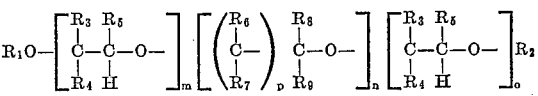

wherein $R_1$ is selected from the group consisting of hydrogen and alkyl radicals having from 1 to about 10 carbon atoms; $R_2$ is selected from the group consisting of hydrogen and alkyl radicals having from 1 to about 8 carbon atoms; $R_3$, $R_4$, $R_5$, $R_6$, $R_7$, $R_8$, and $R_9$ are selected from the group consisting of hydrogen and alkyl radicals having from 1 to about six carbon atoms; $m$ is an integer having a value from 1 to about 150; $n$ is an integer having a value from 0 to 4; $o$ is an integer having a value from 0 to about 150, but is such that the sum of $m$ and $n$ is not greater than 150; and $p$ is an integer having a value from 1 to 3; and (*b*) from .01 to 5.0 percent by weight, based upon the total weight of the polyoxyalkylene composition, of 6-tertiary-butyl-5-indanol.

References Cited by the Examiner
UNITED STATES PATENTS

| | | | |
|---|---|---|---|
| 2,114,832 | 4/38 | Evans | 260—611.5 |
| 2,363,687 | 11/44 | Paul | 260—619 X |
| 2,819,249 | 1/58 | Petropoulos et al. | 260—619 X |

FOREIGN PATENTS

| | | |
|---|---|---|
| 558,229 | 6/59 | Canada. |

LEON ZITVER, *Primary Examiner.*